United States Patent
Theodore et al.

(10) Patent No.: US 8,877,068 B2
(45) Date of Patent: Nov. 4, 2014

(54) ACIDIFICATION PRE-TREATMENT FOR UV WATER DISINFECTION

(71) Applicants: Marcus G. Theodore, Salt Lake City, UT (US); Terry R. Gong, Moraga, CA (US)

(72) Inventors: Marcus G. Theodore, Salt Lake City, UT (US); Terry R. Gong, Moraga, CA (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 175 days.

(21) Appl. No.: 13/692,034

(22) Filed: Dec. 3, 2012

(65) Prior Publication Data

US 2014/0151307 A1 Jun. 5, 2014

(51) Int. Cl.
*C02F 1/32* (2006.01)
*C02F 1/00* (2006.01)
*C02F 1/66* (2006.01)
*C02F 101/20* (2006.01)

(52) U.S. Cl.
CPC . *C02F 1/32* (2013.01); *C02F 1/004* (2013.01); *C02F 1/66* (2013.01); *C02F 2101/20* (2013.01)

USPC .................................. 210/748.12; 210/748.18

(58) Field of Classification Search
CPC .......................................................... C02F 1/32
USPC ........................................ 210/748.12, 748.16
See application file for complete search history.

(56) References Cited

U.S. PATENT DOCUMENTS

| 6,264,836 B1 * | 7/2001 | Lantis ........................... 210/188 |
| 6,884,391 B1 * | 4/2005 | Khoe et al. ...................... 422/24 |
| 7,416,668 B1 * | 8/2008 | Theodore ....................... 210/603 |

OTHER PUBLICATIONS

United States Office of Water EPA 832-F-99-064 "Wastewater Technology Fact Sheet Ultraviolet Disinfection", Washington D.C. Sep. 1999.

* cited by examiner

*Primary Examiner* — Fred Prince
(74) *Attorney, Agent, or Firm* — Marcus G. Theodore

(57) ABSTRACT

A pre-treatment method injecting sulfur dioxide into waters containing suspended solids to undergo ultra violet disinfection to form sulfurous acid ($H_2SO_3$) to self-agglomerate and precipitate solids from the wastewater for settling or filtration removal and provide acid to reduce bicarbonate and mineral scaling and microbial buildup on ultraviolet light tubes to improve their performance.

3 Claims, 1 Drawing Sheet

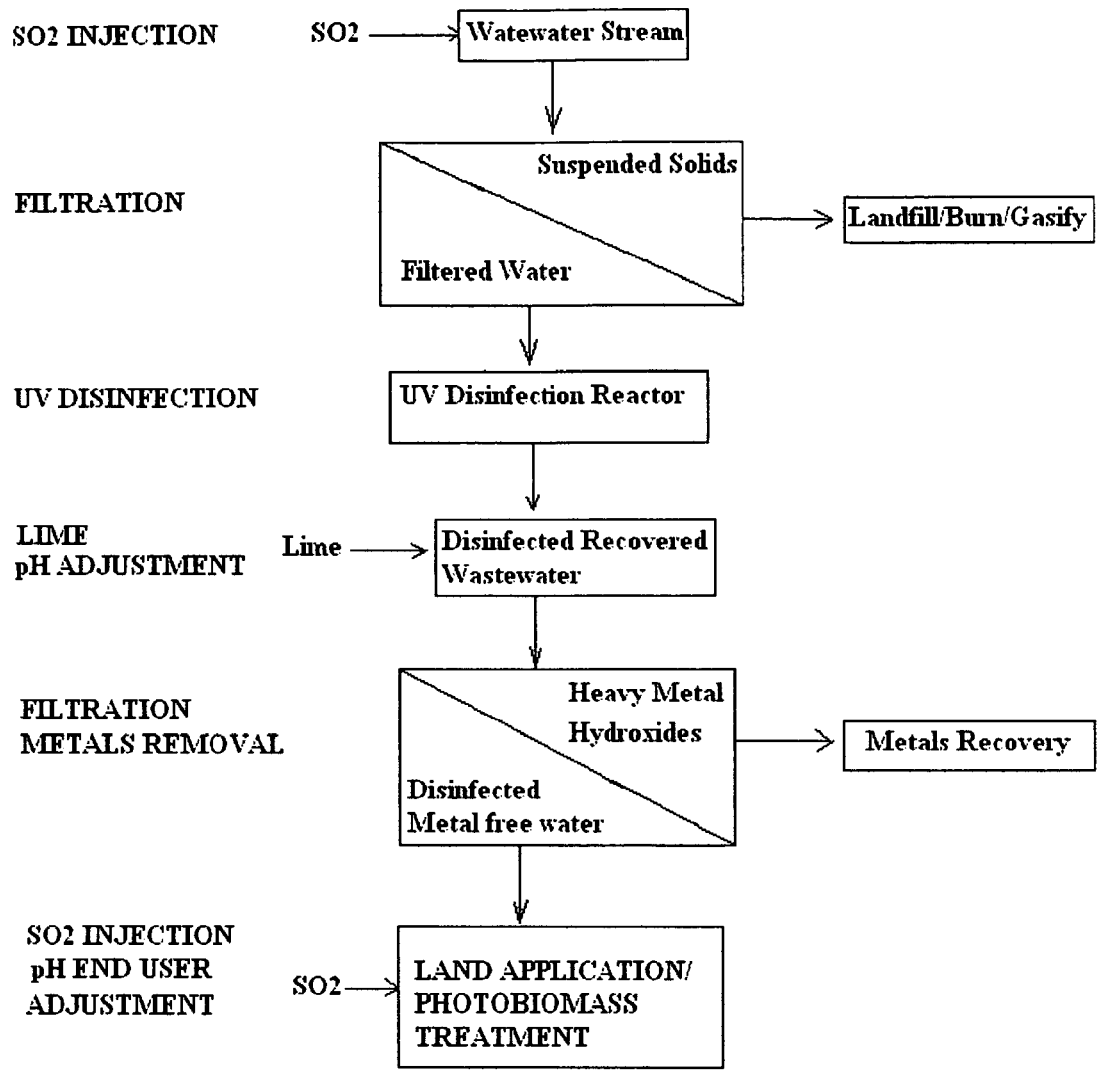

ACIDIFICATION PRE-TREATMENT FOR UV WATER DISINFECTION

RELATED APPLICATIONS

This application is a continuation-in-part of prior patent application Ser. No. 12/803,905 filed Jul. 9, 2010 entitled "Acidification Pre-Treatment for UV Water Disinfection".

BACKGROUND OF THE INVENTION

1. Field

This invention pertains to maintenance and operation methods to clean and operate UV water treatment disinfection systems. In particular it pertains to a pre-treatment method before ultraviolet irradiation particularly suited for disinfecting irrigation, wastewaters, and other waters having suspended solids. The pre-treatment method utilizes sulfurous acid to self-agglomerate and precipitate solids from the water fraction for settling or filtration removal and provides acid to reduce mineral scaling and microbial buildup on uv light tubes to improve their performance.

2. State of the Art

Ultraviolet light disinfection is used to disinfect a variety of waters avoiding the need for chlorine. It is particularly suited for disinfecting culinary and wastewaters. According to the United States Office of Water EPA 832-F-99-064 Environmental Protection Agency publication entitled "Wastewater Technology Fact Sheet Ultraviolate Disinfection", Washington, D.C. September 1999, "Disinfection is considered to be the primary mechanism for the inactivation/destruction of pathogenic organisms to prevent the spread of waterborne diseases to downstream users and the environment. It is important that wastewater be adequately treated prior to disinfection in order for any disinfectant to be effective . . . .

An Ultraviolet (UV) disinfection system transfers electromagnetic energy from a mercury arc lamp to an organism's genetic material (DNA and RNA). When UV radiation penetrates the cell wall of an organism, it destroys the cell's ability to reproduce. UV radiation, generated by an electrical discharge through mercury vapor, penetrates the genetic material of microorganisms and retards their ability to reproduce. The effectiveness of a UV disinfection system depends on the characteristics of the wastewater, the intensity of UV radiation, the amount of time the microorganisms are exposed to the radiation, and the reactor configuration. For any one treatment plant, disinfection success is directly related to the concentration of colloidal and particulate constituents in the wastewater.

The main components of a UV disinfection system are mercury arc lamps, a reactor, and ballasts. The source of UV radiation is either the low-pressure or medium-pressure mercury arc lamp with low or high intensities.

The optimum wavelength to effectively inactivate microorganisms is in the range of 250 to 270 nm. The intensity of the radiation emitted by the lamp dissipates as the distance from the lamp increases. Low-pressure lamps emit essentially monochromatic light at a wavelength of 253.7 nm. Standard lengths of the low-pressure lamps are 0.75 and 1.5 meters with diameters of 1.5-2.0 cm. The ideal lamp wall temperature is between 95 and 122° F.

Medium-pressure lamps are generally used for large facilities. They have approximately 15 to 20 times the germicidal UV intensity of low-pressure lamps. The medium-pressure lamp disinfects faster and has greater penetration capability because of its higher intensity. However, these lamps operate at higher temperatures with a higher energy consumption.

There are two types of UV disinfection reactor configurations that exist: contact types and noncontact types. In both the contact and the noncontact types, wastewater can flow either perpendicular or parallel to the lamps. In the contact reactor, a series of mercury lamps are enclosed in quartz sleeves to minimize the cooling effects of the wastewater. FIG. 1 shows two UV contact reactors with submerged lamps placed parallel and perpendicular to the direction of the wastewater flow. Flap gates or weirs are used to control the level of the wastewater. In the noncontact reactor, the UV lamps are suspended outside a transparent conduit, which carries the wastewater to be disinfected. This configuration is not as common as the contact reactor. In both types of reactors, a ballast—or control box—provides a starting voltage for the lamps and maintains a continuous current.

Advantages and Disadvantages

Advantages

UV disinfection is effective at inactivating most viruses, spores, and cysts.
UV disinfection is a physical process rather than a chemical disinfectant, which eliminates the need to generate, handle, transport, or store toxic/hazardous or corrosive chemicals.
There is no residual effect that can be harmful to humans or aquatic life.
UV disinfection is user-friendly for operators.
UV disinfection has a shorter contact time when compared with other disinfectants (approximately 20 to 30 seconds with low-pressure lamps).
UV disinfection equipment requires less space than other methods.

Disadvantages

Low dosage may not effectively inactivate some viruses, spores, and cysts.
Organisms can sometimes repair and reverse the destructive effects of UV through a "repair mechanism," known as photo reactivation, or in the absence of light known as "dark repair."
A preventive maintenance program is necessary to control fouling of tubes.
Turbidity and total suspended solids (TSS) in the wastewater can render UV disinfection ineffective. UV disinfection with low-pressure lamps is not as effective for secondary effluent with TSS levels above 30 mg/L.
UV disinfection is not as cost-effective as chlorination, but costs are competitive when chlorination dechlorination is used and fire codes are met."

Thus, UV disinfection can be used in wastewater treatment plants of various sizes that provide secondary or advanced levels of treatment. However, all have a maintenance need for removal of suspended solids and reduction of bicarbonates within the wastewater to prevent light scattering and scaling buildup on the UV lamps interfering with the effectiveness of ultraviolet irradiation. The method and apparatus described below provides such a pre-treatment method and apparatus for ultraviolet disinfection of a variety of waters having suspended solids.

SUMMARY OF THE INVENTION

Method

The present invention comprises a pre-treatment method utilizing sulfurous acid to condition waters undergoing ultraviolet disinfection. The sulfurous acid conditions suspended solids in the water streams to self agglomerate for settling or better filtration removal and provide acid to reduce mineral scaling and microbial buildup on ultraviolet light tubes to improve their performance. It is particularly suited as a pre-treatment method for saline wastewater undergoing ultraviolet light disinfection before land application. The method comprises injecting into treated or untreated waters sulfur dioxide at a pH which generates sufficient $SO_2$ to reduce alkalinity scaling conditions, and self agglomerates the solids to minimize adherence to the separation surfaces or membranes. For each mole of $SO_2$ added, one mole of bicarbonate is eliminated as $CO_2$ gas, preventing scaling on the ultraviolet light tubes.

Usually the sulfur dioxide gas is generated by oxidation of elemental sulfur via a sulfur burner for injection and capture into an aqueous solution via water scrubbing of a stream of either treated or untreated wastewater to form sulfurous acid ($H_2SO_3$). The $SO_2$ molecule is less than 2.8 angstroms and therefore passes through the pores of most solids removal filters, except the finer reverse osmosis filtration membranes, providing pre-treatment. This continuous pre-treatment thus provides mild acid to clean each ultraviolet light tube separately.

Conditioning of the solids is defined as treating the solids with sufficient $SO_2$ to chemically self adhere to aid in their settling or separation and removal from filtration screens or membranes, but at a level not affecting the permeation characteristics of the filter or membrane. Based on field tests at the Montalvo Municipal Improvement District wastewater treatment plant in Ventura, Calif., settling of self-agglomeration in open ponds occurs at a pH of approximately 3 to 6.5 resulting in the fine suspended solids dropping to the bottom of percolation ponds. This left clear treated effluent where the bottom can be seen at a depth of 7 to 8 feet in the ponds as opposed to 2-3 feet with no acid treatment. This fine layer of suspended solids on the bottom of the pond chemically dewaters, when dried, to a water content of less than 10% and does not adversely affect percolation.

As disinfection is accomplished with uv exposure, it is not necessary to apply overly concentrated sulfur dioxide (SO2) into the water streams for disinfection before undergoing ultraviolet light disinfection. Sufficient sulfurous acid reducing solution, which dissociates to produce hydrogen ions, sulfites, bisulfites and free SO2 at an acid concentration below that required for disinfection, but sufficient to chemically dewater and agglomerate suspended solids without polymers, acid leach heavy metals from the solids into acidified liquid fractions and reduce bicarbonate levels to reduce alkalinity scaling and iron deposit buildup on the uv light tubes is all that is required—typically between pH 4 and 6.9. This saves considerable chemical pre-treatment expense, while providing sufficient self agglomeration to remove the solids before uv exposure.

The $SO_2$ thus acts as a surfactant, which aids in the prevention and removal of films building up on the ultraviolet light tubes. Sulfur dioxide has lone pairs and can act either as a Lewis acid or base. As a strong reducing agent acting as a Lewis acid, it provides disinfection without chlorine to minimize light tube growth to extend the time in between cleanings Bicarbonate scaling and fouling are also significantly reduced, lowering the frequency of cleaning of the light tubes. Adding sulfurous acid instead of dangerous concentrated sulfuric acid provides safety while providing equivalent reduction in scaling and the added benefit of self adhering solids, which don't adhere to the surfaces of the light tubes. Addition of $SO_2$ also avoids the addition of calcium, which increases the likelihood of lime scaling such as when calcium hyposulfite is added.

In addition, iron deposits are minimized due to the sulfurous acid acidity and reducing properties.

When used to pre-treat and also disinfect raw wastewater, $SO_2$ conditioning generally results in a color change of the solids from a dark brown to a lighter gray brown color. Similarly, the $SO_2$ treated liquids generally change from a greenish color to a lighter gray brown colloidal suspension color. The malodorous smell of the raw wastewater is replaced by a slight acidic smell. Consequently, the conditioning point when added disinfection is required can easily be determined by injecting more and more $SO_2$ into the wastewater until the color and odor changes occur—usually observed at a pH of approximately between 1.5 and 3.

The basic chemical reactions of $SO_2$ in water are:

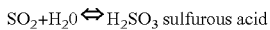

$SO_2 + H_2O \Leftrightarrow H_2SO_3$ sulfurous acid

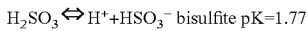

$H_2SO_3 \Leftrightarrow H^+ + HSO_3^-$ bisulfite pK=1.77

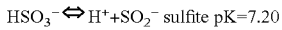

$HSO_3^- \Leftrightarrow H^+ + SO_3^{2-}$ sulfite pK=7.20

This means 50% of the $SO_2$ is gas at pH 1.77 and 50% is $HSO_3^-$. In a similar manner, 50% is $HSO_3^-$ and 50% is $SO_3^{2-}$ at pH 7.2. Halfway between pH 7.2 and 1.77 is 5.43, the pH where all of the sulfur exists as the $HSO_3^-$ form. At a pH of 10.86, all of the sulfur should exist as $SO_3^{2-}$.

Making an aqueous solution too acidic (pH 0 to 3.5) results in an excess of $SO_2$ gas providing maximum biocidal activity. However, this allows the $SO_2$ gas to vent out of solution exposing the operator to $SO_2$. This can be avoided as the best operating conditions are at the point of about pH 5.43 where dominantly $HSO_3^-$ will exist. The acid level is thus selected ensuring the concentration of the $SO_2$ and acid will not adversely attack and degrade solids separation filtration filters and membranes.

Sulfurous acid pre-treatment thus removes suspended particles, which cause scattering of ultraviolet light. It also reduces film buildup on the ultraviolet light tubes so that at the germicidal wavelength of 253.7 nanometers, ultraviolet light alters the genetic (DNA) material in cells so that bacteria, viruses, molds, algae and other microorganisms can no longer reproduce. The microorganisms are considered dead, and the risk of disease from them is eliminated. As the wastewater flows past the UV lamps in UV disinfection systems, the microorganisms are exposed to a lethal dose of UV energy. UV dose is measured as the product of UV light intensity times the exposure time within the UV lamp array. Microbiologists have determined the effective dose of UV energy to be approximately about 34,000 microwatt-seconds/cm2 needed to destroy pathogens as well as indicator organisms found in wastewater. Thus, typical uv disinfection systems and devices emit UV light at approximately 254 nm, which penetrates the outer cell membrane of microorganisms, passes through the cell body, reaches the DNA and alters the genetic material of the microorganism, destroying it without chemicals by rendering it unable to reproduce.

Biofilms are formed usually by various bacteria (some may be by actinomycetes and rarely possibly by fungi or yeasts). These bacteria associate themselves with any solid surface where conditions are right. These bacteria grow and reproduce forming a mucous type exudate with a high content of carbohydrates surrounding their cells. This may result in the formation of scaling on the surface of ultraviolet light tubes. Strong oxidizing agents are commonly used, but are not very effective in removing biofilms once formed, because these oxidizing agents attack only the surface of the biofilm consisting of the carbohydrate. Seldom does the oxidizing agent penetrate deeply enough to contact and kill these bacteria. It is true, once the biofilm forms, the bacteria are embedded throughout the biofilm mass of carbohydrate. This means the treatment with strong oxidizing agents will destroy some (but very seldom all) of the bacteria causing the scaling formation.

The use of $SO_2$ disinfected water for ultraviolet light tube maintenance works in three major ways. First, the $SO_2$ gas pre-treatment serves as an active biocide providing primary disinfection before secondary uv disinfection. The exact way the $SO_2$ gas actually inhibits the growth of the bacteria (as a biocidal function) is not completely known at the present time. Sulfur dioxide has both antioxidative and antimicrobial properties. Sulfur dioxide strongly inhibits some microbial activity by denaturing several enzyme systems. The microbial inhibition occurs due to the molecular $SO_2$ molecule and only limited biocidal effect bisulfite ($HSO_3^-$) with no microbial effect due to the sulfite ($SO_3^{2-}$) ion. Similarly, organically bound sulfite has little microbial inhibition, except the aldehyde-bisulfite at >50 mg/L inhibiting some lactic acid bacteria. Molecular $SO_2$ is only present at pH values below 4.0 and its presence increases markedly with lower pH values. Because molecular $SO_2$ has no ionic charge, it is believed to cross cell walls rapidly. At physiological pH values of most cells, the molecular $SO_2$ is rapidly ionized to bisulfite and sulfite. Consequently, at low levels of $SO_2$, microorganisms may be able to survive $SO_2$ treatment, but not the final ultraviolet light treatment. Continued $SO_2$ presence will eventually result in the accumulation of sulfurous acid ($H_2SO_3$) within the cell and cause the cell pH to drop resulting in an increasing presence of molecular $SO_2$ consequently inhibiting cell growth.

Although anaerobic (no oxygen) microorganisms may be stimulated in the presence of sulfur dioxide treated water, these microbes are susceptible to the biocidal effect of the sulfur dioxide ($SO_2$). This will strongly discourage the initial colonization and growth of any biofilm-producing microbe; particularly where ultraviolet light tubes are occluded with scaling. Thus, the $SO_2$ gas interferes directly with some metabolic function.

Second, the $SO_2$ gas treatment will produce the mild sulfurous acid ($H_2SO_3$), which will ionize to release an active acidic hydronium ion $[(H_2O)_x.H^+]$, which effectively reacts with and eliminates most of the bicarbonate ($HCO_3^-$) ion scaling buildup from the $SO_2$ gas treated water. In all probability, the formation of biofilms is encouraged by the presence of bicarbonates reacting with calcium ions ($Ca^{2+}$) in the non-acid treated water forming minute deposits of calcium carbonate ($CaCO_3$ or lime deposit) on the ultraviolet light tubes. This initial deposit will provide an active site for the biofilm-producing bacteria to find an initial anchor point. Once this occurs, the biofilm can fully develop. Thus, the $SO_2$ gas treated water prevents formation of the initial lime deposit of $CaCO_3$ and thereby discourages the growth of the biofilm bacteria initiating the biofilm formation. In addition, the biocidal activity of the $SO_2$ gas will reduce the overall growth of the biofilm bacteria.

Third, the $SO_2$ gas also acts as an oxygen-scavenging molecule. The oxygen scavenging nature of the sulfur dioxide helps to prevent aerobic microorganisms from obtaining oxygen for their growth. This means, any time oxygen gas ($O_2$) exists, the $SO_2$ gas wants to react with the oxygen to oxidize the sulfur to the sulfur trioxide ($SO_3$) gas form, reacting with water to form sulfate ions ($SO_4^{2-}$). This will deprive the aerobic bacteria in the biofilm from having oxygen for normal growth. A wide variety of anaerobic organisms (often poisoned by oxygen because they lack the essential enzymes necessary to remove the oxygen gas) exist naturally and my form biofilms.

Once biofilms do form, it is more difficult for the $SO_2$ gas treated water to penetrate the carbohydrate layer protecting these microbes. Therefore, the preferred application of the $SO_2$ gas treated water is pretreatment to prevent initial biofilm formation.

To land apply disinfected saline wastewater leaving the ultraviolet treatment cells, the sulfurous acid treatment is neutralized with lime or calcium oxide to a pH that maintains soluble calcium in the brine water, which may be applied to soil to help improve the water penetration. This sulfurous acid calcium pH adjustment treatment method avoids a major problem for the long-term water infiltration in current municipal wastewater treatment for recharging aquifers. Current methods do not use acids to neutralize or eliminate the bicarbonates. This lack of treatment results in water containing an abundance of calcium and bicarbonates, forming insoluble calcium carbonate lime deposits, which, if land applied, eventually clog the soil pores with lime deposits. By using $SO_2$ gas treated water, the disinfected saline wastewater will consist of almost no bicarbonate ions. This means the calcium ions will remain in solution. When this recovered treated wastewater is land applied, the overall effect on the soil will be more of a salt effect, rather than the current condition of excessive sodium causing a sealing of the soil surface.

The sulfur dioxide pre-treatment process is not based upon a constant concentration of sulfur dioxide. Instead, the sulfur dioxide addition depends upon the total alkalinity of the water. The system is adjusted to a pre-designated pH value (ideally about pH 5). Thus, the amount of sulfur dioxide injected into the feed water for reverse osmosis will vary depending upon the total alkalinity. The more critical factor is to maintain appropriate pH adjustment. The pH of the feed water can be adjusted for each type of ultraviolet tube structure. This will insure more optimum functioning of each ultraviolet light.

For land application, the sulfurous acid addition first provides for maintaining soluble salts and prevents formation of precipitates inside soil pores, which eventually clog the surface soil preventing further water infiltration and water application to the soil for reclamation.

Second, the bisulfite will be oxidized by the *Thiobacillus* and the *Acidithiobacillus* bacteria in the soil. This will allow the calcium carbonate ($CaCO_3$) commonly existing in western U.S. soils to become dissolved as calcium sulfate ($CaSO_4$) similar to gypsum. The dissolved calcium will flocculate the soil clay and humus particles maintaining the water infiltration rate at the soil surface. The calcium will displace (exchange with) the sodium on the soil cation exchange capacity (CEC) sites. This will allow the sodium salts to move downward with the water and enhance the reclamation of the surface soil.

Conditioning of land applied disinfected wastewater involves the following sulfurous acid/lime adjustments:

a. SAR indicates the relative activity of sodium ions as they react with clay. The Sodium Adsorption Ratio (SAR) is a property of the water phase. The SAR determines the relative hazard caused by applying water having a high SAR to soil. When the SAR is high (>15), more of the sodium (Na+) ions in the solution phase will become adsorbed onto the solid phase (clay minerals and humus) of the soil. This solid phase of clay minerals and humus contains a net negative electrical charge and is termed the soil Cation Exchange Capacity (CEC). As more sodium ions are adsorbed to the solid phase, the soil aggregates composed of large conglomerations of sand, silt, clay and humus particles become destabilized. This condition is termed dispersion, disaggregation or defloccula- tion. The result is the transformation of the aggregates into their individual sand, silt, clay and humus particles as opposed to the previously aggregated particles. The result of this transformation is the destruction of the soil's ability to transmit air, water and plant roots. As these dispersed silt and clay particles move downward, they cover the previously existing soil pores and effectively block further water infil- tration and penetration through the soil.

b. MVCAR. Technically, the SAR should be expanded to include all monovalent cations. Thus, we also use the Mono- Valent Cation Adsorption Ratio (MVCAR), rather than sim- ply the SAR as a measure of potential hazard of the liquid water phase solution. These monovalent cations normally present in water and soils include sodium (Na+), potassium (K+) and ammonium (NH4+) ions. Municipally treated wastewater effluent often has an elevated level of sodium and of ammonium ions. Irrigation of a soil with this type of water (high MVCAR) can cause dispersion, disaggregation, or deflocculation of the soil particles.

c. EC—to insure adequate water infiltration and water per- meability through the soil, the Electrical Conductivity (EC) of irrigation water should be brought to greater than 0.3 ds/m or greater than 0.3 mmhos/cm. with the addition of soluble calcium. This prevents deflocculation or dispersion of the soil. When water has been treated to remove all of the major cations [namely, calcium ($Ca^{2+}$), magnesium ($Mg^{2+}$), sodium (Nat), potassium ($K^+$) and ammonium ($NH4^+$) ions], then another problem occurs. As the total salt concentration approaches zero (as occurs when the Electrical Conductivity EC of the water approaches zero), the soil will disperse easily. This condition occurs during Reverse Osmosis (RO) condi- tions applying pure filtrate for irrigation. The reason for this dispersion is the system must have a relative equilibrium of adsorbed (solid phase) cations and solution phase cations to maintain the stability of the soil aggregates.

The solution to the soil dispersion problem is first to know what the EC and SAR or MVCAR are for a specific water intended for use as irrigation or for use in water recharge of any underground aquifer. It has long been recognized a high SAR or MVCAR can cause this problem. However, the lower the EC of the water used for irrigation, the greater the hazard of using this water. Second, the only way to insure this prob- lem will not manifest itself and prevent dispersion of the soil system is to add additional soluble calcium ($Ca^{2+}$) ions to the system (regardless of whether the cause is a high SAR or MVCAR or a very low EC in the liquid phase.

The added soluble calcium for this process can be derived from various sources. Gypsum (calcium sulfate dihydrate) or calcium carbonated lime plus sulfur dioxide (SO2) forming calcium sulfite reacting to form soluble calcium ions. The soluble calcium ($Ca^{2+}$) ions in the solution phase are attracted to the solid phase CEC sites of the soil particles resulting in flocculation and aggregate stabilization. Failure to amend water applied to soil will result in the eventual destruction of the soil aggregates and cause dispersion, disaggregation and deflocculation.

Other calcium sources are hydrous and anhydrous lime (CaO, $Ca(OH)_2$), which are preferred for heavy metals removal as discussed below. Spent lime (precipitated $CaCO_3$ from sugar beet processing) is a particularly good source.

Note soil dispersion hazards can occur under all conditions when the EC is very low (as occurs with rain water, snow melt water or RO treated water). Again, it is critical to increase the level of soluble calcium ($Ca^{2+}$) ions when this very low EC condition occurs in water applied to soil. Irrigation with water having a high ammonium concentration (as occurs with ammonium fertilizer injected into irrigation water) or when municipally treated wastewater is irrigated can result in soil dispersion. Again, an adequate concentration of soluble cal- cium ions must be present to prevent the dispersion, disag- gregation or deflocculation of the soil system. The presence of magnesium ($Mg^{2+}$) ions is insufficient to correct this prob- lem.

Furthermore, a high concentration of bicarbonate and/or carbonate can exacerbate the monovalent cation problem. When bicarbonate and/or carbonate are present, they react with the soluble calcium and magnesium converting these ions into insoluble calcium carbonate and magnesium car- bonate. This process removes the required calcium ions from the solution phase. This magnifies the problem because the calcium concentration where it appears in the lower fraction of the SAR or the MVCAR formula. The result is the ratio becomes multiplied as a consequence of this precipitation of previously soluble calcium and magnesium ions. Hence, the SAR measurement was retained in the claims to indicate how the disinfected treated recovered wastewaters are monitored and adjusted to avoid either very low EC conditions or high SAR conditions.

Also, it is crucial to consider the pH of any soil system to insure the pH is near a value of 6.5 (thereby reducing the problem of high bicarbonate and/or carbonate) and insuring the presence of soluble calcium ions existing in the treated system. Failure to make this pH adjustment will cause pre- cipitation of the calcium carbonate and magnesium carbon- ate. These insoluble carbonates will form inside the existing soil pores and will eventually plug these pores; thereby inhib- iting the subsequent movement of water downward through the soil.

From the SAR, the proportion of sodium on the clay can be estimated when irrigation water has been used for a long period with reasonable irrigation practices. The SAR is a good index of the sodium permeability hazard if water passes through the soil and reaches equilibrium with it. From long experience, if the SAR is less than 3, there should be no problems with either sodium or permeability. In the range of 3 to 9, there are increasing problems. Above 9, severe prob- lems can be expected.

A number of state and federal agencies have surveyed soils and preferred crop conditions throughout the United States. For example, the US Department of Agriculture Agricultural Research Service (USDAARS) has established various soil measurement guidelines. Its laboratory personnel have estab- lished criteria for diagnosing saline and sodic soils. Electrical conductivity (EC) of the soil saturation extract was intro- duced as a practical index of soil salinity. The threshold EC value of 4 dS/m is still used world wide to diagnose and classify saline soils. A threshold of 15 for the exchangeable sodium percentage (ESP) defined as the ratio of sodium (Na+) to the total cation exchange capacity [ESP=((Na+ cmol/kg)/ (CEC cmol/kg))*100], indicates soil sodicity and permeabil- ity and structural problems.

Key practical diagnostic criteria used to evaluate water suitability for irrigation and its potential for degrading soils were developed at the USDAARS Salinity Laboratory. These include electrical conductivity (EC) mentioned above, sodium adsorption ratio (SAR), adjusted SAR, and boron (B) hazard. Electrical conductivity is the universal standard measure of water salinity hazards. Sodium adsorption ratio is also a universal standard indicating a water's potential to cause sodic conditions and poor soil structure. Both of these indicators are critical for management decisions and together constitute the basis of a classification system for waters with respect to their salinity and sodicity hazard. Adjusted SAR was developed to correct the measure of sodium hazard for the tendency of calcium carbonate to precipitate from irrigation waters and to improve the appraisal of water quality, predicting potential infiltration problems.

The USDAARS Laboratory has also been at the forefront of determining the boron and salt tolerance of enumerable plant species. One USDAARS Laboratory study quantified all available salt tolerance data by presenting threshold salinity values for yield decrease and linear yield decrease per unit of salinity. Thus a given crop's response to salinity can be describe using only two variables, thereby simplifying the selection of an appropriate crop for waters and soils of a given salinity. Salt tolerance tables, thresholds, and yield responses are provided in all manuals and handbooks dealing with crop production on saline soils and/or with saline waters and are used world-wide.

Salt balance and leaching requirements for water used for irrigation has also been established. The salt balance is the difference between the salt input and the salt output for a given irrigation project, and is used to evaluate the adequacy of drainage facilities, leaching programs, and water requirements for removing salts, and sustaining irrigation in general. This method is still used in monitoring programs by many irrigation projects. The leaching requirement establishes the fraction of irrigation water that must be leached through the root zone to maintain an acceptable level of salinity for cropping purposes. Minimized leaching concepts developed by the USDAARS Laboratory were at the core of the water quality control measures adopted for implementation to control salinity of the Colorado River.

USDAARS Laboratory scientists have been at the forefront in developing reclamation procedures and guidelines for saline and sodic soils. To reclaim saline soils, leaching strategies especially continuous ponding and intermittent ponding were developed by Laboratory scientists and are universally used. To reclaim sodic soils, they pioneered the use of the soil amendments: gypsum, sulfuric acid, sulfur, and calcium chloride to replace exchangeable sodium along with leaching. The gypsum requirement, the amount of amendment required to affect reclamation of a given amount of exchangeable sodium, was developed at the Salinity Laboratory as the universally used reclamation standard.

These studies established that plants exhibit differences in salinity tolerance at various growth stages. The information allows a cyclical watering strategy where good quality water was used for growth of sensitive crops during sensitive growth stages, while saline drainage water may be used for the growth of tolerant crops or during tolerant growth stages. The U.S. Bureau of Reclamation and the California Resources Agency have adopted minimized leaching and drainage water reuse concepts to conserve water, minimize drainage volumes, and protect water quality as the heart of the San Joaquin Valley Drainage Program.

In summary, for various soil regions, soil conditions have been identified, which must be adjusted by applying conditioned irrigation waters to meet soil conditions required to grow selected salt sensitive crops. The present ultraviolet pre-treatment method is unique in both cleaning and maintaining the ultraviolet light tubes to condition recovered wastewaters for land application. This is accomplished by carefully monitoring brine levels of the disinfected saline waters, and then adding the necessary sulfurous acid or lime for SAR adjustment. The sulfurous acid breaks down soil carbonates/bicarbonates to insure soil porosity in a manner previously not employed in ultraviolet light disinfection pretreatment.

The conditioned, ultraviolet light disinfected saline wastewater is also suitable for raising photobiomass, such as algae, duckweed, and other aquatic plants, which can be harvested for reuse.

Apparatus

A preferred pre-treatment apparatus is as follows. Although sulfur dioxide from tanks associated with a contact mixer can be used to acidify the water to be pretreated, a sulfurous acid generator, such as those produced by Harmon Systems International, LLC of Bakersfield, Calif., is preferred as they are designed to produce the $SO_2$ on demand on an as needed basis. The $SO_2$ is immediately captured in an aqueous form as sulfurous acid ($H_2SO_3$) preventing harmful operator exposure. The sulfur dioxide is injected into the water at a pH less than 6.9, depending upon the bicarbonate level and dwell time required for solids conditioning. At these pH ranges, sufficient $SO_2$ is generated to condition solids for separation. It was found through testing the Harmon sulfurous acid generator can condition and treat incoming raw wastewater solids to self agglomerate into colloidal self adhering solids which do not adhere to contact surfaces. The Harmon sulfurous acid generator has the advantage of generating $SO_2$, as needed, avoiding the dangers of stored SO2 tank storage. However, the main advantage in passing the water directly through the sulfurous acid generator is that it creates and introduces onsite $SO_2$ without adding other compounds or materials such as when using sodium meta-bisulfite and/or potassium meta bisulfite into the system, or additional acid compounds for pH lowering. The pre-treatment method uses both unfiltered and filtered water as the medium to scrub and form the sulfurous acid. Consequently, the treated water volume is not affected.

In one preferred pre-treatment embodiment, the water is fed directly through the Harmon sulfurous acid generator to create concentrated solution of sulfurous acid ($H_2SO_3$), which is then reintroduced and diluting it again into the main body of water prior to filtration. Doing this enhances the filtration separation process because: 1.) Sulfurous Acid neutralizes Total Alkalinity, thereby eliminating the mineral scaling problem. 2.) The resulting Bisulfite ($HSO_3^-$) attacks microorganisms within the water to reduce and/or prevent microbial scaling problem. 3.) The Bisulfite provides a means in which dissolved oxygen can be scavenged and removed from the water to prevent aerobic bacteria film buildup. 4.) Since the resultant material will be a sulfate ($SO_4^{2-}$), this material can now bond (with other constituents within the water) to form useful compounds (such as calcium sulfate) having the potential of transforming the saline recovered wastewater collected into something desirable and marketable (a calcium rich supplement added to replenish depleted soil environments such as those found in areas of high rainfall and/or calcium deficiency).

Separation of solids and precipitates is accomplished through the use of conventional filtration equipment, woven filtration bags, clarifiers, etc. The admixing of limes, acids, and ferrous hydroxide is accomplished with conventional mixers and injectors. The exact type of equipment is not critical as the acid and base reactions are rapid and the chemicals are readily handled without harm to the operator.

Pre-treating water with $SO_2$/Sulfurous Acid thus results in reduction in overall maintenance of the entire ultraviolet disinfection system and can provide a recovered treated wastewater suitable for land application or raising photobiomass as discussed above.

DESCRIPTION OF THE DRAWINGS

FIG. 1 is a schematic view of a preferred method for treating wastewater.

DESCRIPTION OF THE ILLUSTRATED EMBODIMENTS

FIG. 1 is a schematic view of a preferred method of the invention as it applies to wastewater. It comprises injecting sufficient sulfurous acid into wastewater streams to be filtered to reduce alkalinity scaling, add sufficient $SO_2$ as a biocide to attack bacteria and other micro organisms to prevent fouling, and to reduce iron to prevent iron deposit build-up. This can be done through single or multiple injection points and is a method that can provide ultraviolet light cleaning benefits.

The continuous addition of small dosages of sulfurous acid self agglomerates the suspended solids in the acidified wastewater stream for removal before ultraviolet light disinfection. These primarily organic solids are chemically conditioned to dewater and therefore have water content less than 10% and can be land filled, burned, or gasified.

The sulfurous acid slows and minimizes scaling, biofilm, and iron deposit build-up on the ultraviolet light tubes, thereby prolonging their life and effectiveness. As the light tubes are continually treated, they may not have to be individually cleaned and replaced at the same time.

The disinfected, recovered wastewater is lime adjusted to overcome high levels of sodium in the wastewater and may be land applied to promote plant growth.

For wastewaters containing high levels of heavy metals and selenium, the pH of the disinfected recovered wastewater is elevated with lime and ferrous hydroxide ($Fe(OH)_2$). This will precipitate heavy metals, such as iron, mercury, lead, cadmium, chromium, arsenic, zinc, manganese, nickel, tin, silver, copper, and other elements that will precipitate as metal or non-metal hydroxides, which are then removed for disposal or reclaiming. For example, although not technically a metal, selenium can also co-precipitate as an hydroxide with ferrous iron hydroxide solids at a pH of 8 to 10. Consequently, for purposes herein, selenium and other substances, which can form hydroxide precipitates at elevated pH levels, will all be referred to as "heavy metals hydroxides". These heavy metal hydroxides are then filtered and separated for metals recovery or disposal. The disinfected demetalized recovered wastewater is then pH adjusted with sulfurous acid to that required pH for land application or raising photobiomass.

For wastewaters with low levels of heavy metals, the disinfected demetalized recovered wastewater is adjusted with lime or spent lime at lower pH levels to provide an increased calcium content of the filtered water to affect a decrease of the Sodium Adsorption Ratio (SAR) to enhance the agronomic condition of the soil to which it is applied. Plants are detrimentally affected, both physically and chemically, by excess salts in some soils and by high levels of exchangeable sodium in others. Soils with an accumulation of exchangeable sodium are often characterized by poor tilth and low permeability making them unfavorable for plant growth. Plant growth is important for mine reclamation for several reasons: (i) it provides an erosion control measure for hill slope erosion and stream bank erosion, (ii) it allows for revegetation of reclaimed areas, and (iii) it can possibly aid in metals uptake by phytoremediation. Sodium adsorption ratios (SAR), along with pH, characterize salt-affected soils. It is an easily measured property providing information on the comparative concentrations of $Na^+$, $Ca^+$, and $Mg^+$ in soil solutions. The equation used to calculate SAR is given as follows:

$$SAR = \frac{[Na^+]}{\sqrt{\frac{1}{2}([Ca^{2+}] + [Mg^{2+}])}}$$

where $[Na^+]$, $[Ca^{2+}]$, and $[Mg^{2+}]$ are the concentrations in mmol/L of sodium, calcium, and magnesium ions (all at single valent equivalents or milliequivalents per Liter) in the soil solution. Concentrations of sodium, calcium, and magnesium are determined by first extracting the ions from the soil into solution. The solution is then analyzed to determine the concentrations of the selected ions. $Na^+$, $Ca^{2+}$, and $Mg^{2+}$ concentrations are commonly determined using atomic absorption spectrometry (AA). The SAR of a soil extract takes into consideration the adverse effect of sodium is moderated by the presence of calcium and magnesium ions. When the SAR rises above 12 to 15, serious physical soil problems arise and plants have difficulty absorbing water according to some studies.

In summary, the pH of the disinfected reclaimed wastewater is pH adjusted with lime, and sulfurous acid, or sequential combinations of both, depending upon the requirements of the end user.

Although this specification has referred to the illustrated embodiments, it is not intended to restrict the scope of the claims. The claims themselves include those features deemed essential to the invention.

We claim:

1. A pre-treatment method for ultraviolet light disinfection of water streams having suspended solids in a liquid fraction using ultraviolet light irradiation from a uv light bank with uv light tubes, comprising:
   a. injecting sulfur dioxide ($SO_2$) into the water streams before undergoing ultraviolet Eight disinfection at a point before the light tubes to form a sulfurous acid reducing solution, which dissociates to produce hydrogen ions, sulfites, bisulfites and free $SO_2$ at an acid concentration below that required for disinfection, but sufficient to chemically dewater and agglomerate suspended solids without polymers, acid leach heavy metals from the solids into acidified liquid fractions and reduce bicarbonate levels to reduce alkalinity scaling and iron deposit buildup on the uv light tubes,
   b. removing and disposing of the suspended solids from the acidified liquid fraction fanning recovered treated water,
   c. passing the recovered treated water between the light tubes to prevent and remove scaling and prevent solids from adhering to the light tubes to provide sufficient exposure to ultraviolet light for disinfection to produce a disinfected recovered treated wastewater, and
   d. adjusting the pH of the disinfected recovered treated water for reuse.

2. A pre-treatment method for ultraviolet light disinfection water streams according to claim 1, wherein the sulfur dioxide is generated onsite and injected, continuously into the water streams at about a pH<6.9 and >4.0 by passing either all or a portion of the water stream through a sulfur burner before undergoing ultraviolet light disinfection.

3. A pre-treatment method for ultraviolet light disinfection of water streams according to claim 2, including land applying the disinfected recovered water to raise crops or photo biomass.

* * * * *

UNITED STATES PATENT AND TRADEMARK OFFICE
CERTIFICATE OF CORRECTION

| | | |
|---|---|---|
| PATENT NO. | : 8,877,068 B2 | Page 1 of 1 |
| APPLICATION NO. | : 13/692034 | |
| DATED | : November 4, 2014 | |
| INVENTOR(S) | : Marcus G. Theodore and Terry R. Gong | |

It is certified that error appears in the above-identified patent and that said Letters Patent is hereby corrected as shown below:

In the Claims

Column 12, line 38, Claim 1(a), "ultraviolet Eight" should read "ultraviolet light".

Signed and Sealed this
Twenty-third Day of December, 2014

Michelle K. Lee
*Deputy Director of the United States Patent and Trademark Office*